(12) United States Patent
Langeslag et al.

(10) Patent No.: US 11,581,804 B1
(45) Date of Patent: Feb. 14, 2023

(54) COMBINED CURRENT SENSE AND CAPACITOR VOLTAGE SENSE FOR CONTROL OF A RESONANT CONVERTER

(71) Applicant: NXP USA, Inc., Austin, TX (US)

(72) Inventors: Wilhelmus Hinderikus Maria Langeslag, Wijchen (NL); Hans Halberstadt, Groesbeek (NL); Frank van Rens, Limburg (NL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/403,947

(22) Filed: Aug. 17, 2021

(51) Int. Cl.
*H02M 3/335* (2006.01)
*H02M 3/00* (2006.01)
*H02M 1/00* (2006.01)

(52) U.S. Cl.
CPC ......... *H02M 3/01* (2021.05); *H02M 3/33569* (2013.01); *H02M 3/33571* (2021.05); *H02M 1/0009* (2021.05)

(58) Field of Classification Search
CPC ...... H02M 1/0009; H02M 3/01; H02M 3/335; H02M 3/33507; H02M 3/33569; H02M 3/33571
See application file for complete search history.

(56) References Cited

U.S. PATENT DOCUMENTS

| | | | |
|---|---|---|---|
| 8,422,250 B2 | 4/2013 | Halberstadt | |
| 8,427,847 B2 | 4/2013 | Halberstadt | |
| 9,065,350 B2 | 6/2015 | Halberstadt | |
| 9,837,907 B1 | 12/2017 | Babazadeh et al. | |
| 2012/0170324 A1* | 7/2012 | Fornage | H02M 3/33573 363/17 |
| 2017/0179833 A1* | 6/2017 | Adragna | H02M 3/335 |
| 2018/0062383 A1* | 3/2018 | Kawashima | H02M 3/33523 |

OTHER PUBLICATIONS

NXP; "TEA2016AAT Digital controller for high-efficiency resonant power supply Rev. 1.2" Product data sheet, Apr. 6, 2020, 58 pages.
NXP; "TEA2017AAT/2 Digital configurable LLC and multimode PFC controller Rev. 1" Product data sheet, Jun. 14, 2021, 63 pages.
NXP; "TEA19161T/2 Digital controller for high-efficiency resonant power supply Rev. 2.1" Product data sheet, May 18, 2021, 44 pages.

* cited by examiner

*Primary Examiner* — Gary L Laxton

(57) ABSTRACT

Various embodiments relate to a converter controller configured to control a resonant converter, including: an integrator configured to receive a current measurement signal from a current measurement circuit in the resonant converter and to produce a capacitor voltage signal indicative of the voltage at the resonant capacitor; a control logic configured to produce a high side driver signal, a low side driver signal, a symmetry error signal based upon the capacitor voltage signal and the current measurement signal; and a symmetry controller configured to produce a symmetry correction signal based upon the symmetry error signal, wherein the symmetry error signal is input into the integrator to control the duty cycle of the high side driver signal and the low side driver signal, wherein the high side driver signal and the low side driver signal control the operation of the resonant converter.

21 Claims, 8 Drawing Sheets

COMBINED CURRENT SENSE AND CAPACITOR VOLTAGE SENSE FOR CONTROL OF A RESONANT CONVERTER

TECHNICAL FIELD

Various exemplary embodiments disclosed herein relate generally to combined current sense and capacitor voltage sense for control of a resonant converter.

BACKGROUND

Resonant converters are widely used to convert a DC voltage into an AC voltage. An LLC (two inductors and one capacitor) converter is a commonly used type of resonant converter. A control method of an resonant power converter may make use of the voltage across the resonant capacitor. Furthermore, the half bridge or full bridge current is measured, such that the converter can operate near a capacitive mode or so that the current in the converter may be limited.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a power converter, including: a resonant converter including: a resonant capacitor; and a current measurement circuit configured to measure current in the resonant capacitor; a converter controller configured to control the resonant converter including: an integrator configured to receive a current measurement signal from the current measurement circuit and to produce a capacitor voltage signal indicative of the voltage at the resonant capacitor; a control logic configured to produce a high side driver signal, a low side driver signal, a symmetry error signal based upon the capacitor voltage signal and the current measurement signal; and a symmetry controller configured to produce a symmetry correction signal based upon the symmetry error signal, wherein the symmetry error signal is input into the integrator to control the duty cycle of the high side driver signal and the low side driver signal, wherein the high side driver signal and the low side driver signal control the operation of the resonant converter.

Various embodiments are described, wherein the current measurement circuit includes a sense resistor in series with the resonant capacitor.

Various embodiments are described, further including a differential amplifier with differential inputs connected across the sense resistor configured to produce the current measurement signal.

Various embodiments are described, wherein the current measurement circuit includes a sense resistor in series with the resonant capacitor and a filter capacitor in parallel with the sense resistor.

Various embodiments are described, wherein the current measurement circuit includes a current sense transformer.

Various embodiments are described, further including a differential amplifier with differential inputs connected across the current sense transformer configured to produce the current measurement signal.

Various embodiments are described, wherein the current measurement circuit includes a sense resistor in series with a sense capacitor, wherein series sense resistor and sense capacitor are connected in parallel with the resonant capacitor.

Various embodiments are described, further including a differential amplifier with differential inputs connected across the sense resistor configured to produce the current measurement signal.

Various embodiments are described, wherein the converter controller includes a voltage sensing circuit configured to receive the capacitor voltage signal and to produce a capacitor high signal and a capacitor low signal that are input into the control logic.

Various embodiments are described, wherein the voltage sensing circuit includes a first comparator configured to compare the capacitor voltage signal to a capacitor high voltage to produce the capacitor high signal and a second comparator configured to compare the capacitor voltage signal to a capacitor low voltage to produce the capacitor low signal.

Various embodiments are described, wherein the converter controller includes a current sensing circuit configured to receive the capacitor voltage signal and to produce a capacitor mode regulate signal and an over current protection signal that are input into the control logic.

Various embodiments are described, wherein the current sensing circuit includes a first comparator configured to produce the capacitor mode regulation signal and a second comparator configured to produce the over current protection signal.

Various embodiments are described, wherein the converter controller includes an adder configured to add the symmetry correction signal to the current measurement signal, wherein an output of the adder is connected to the integrator.

Various embodiments are described, wherein the integrator includes an adjustable gain.

Various embodiments are described, further including a differential amplifier with differential inputs connected to the current measurement circuit, wherein the differential amplifier is configured to produce the current measurement signal.

Further various embodiments relate to a converter controller configured to control a resonant converter, including: an integrator configured to receive a current measurement signal from a current measurement circuit in the resonant converter and to produce a capacitor voltage signal indicative of the voltage at the resonant capacitor; a control logic configured to produce a high side driver signal, a low side driver signal, a symmetry error signal based upon the capacitor voltage signal and the current measurement signal; and a symmetry controller configured to produce a symmetry correction signal based upon the symmetry error signal, wherein the symmetry error signal is input into the integrator to control the duty cycle of the high side driver signal and the low side driver signal, wherein the high side driver signal and the low side driver signal control the operation of the resonant converter.

Various embodiments are described, including a voltage sensing circuit configured to receive the capacitor voltage signal and to produce a capacitor high signal and a capacitor low signal that are input into the control logic.

Various embodiments are described, wherein the voltage sensing circuit includes a first comparator configured to compare the capacitor voltage signal to a capacitor high voltage to produce the capacitor high signal and a second comparator configured to compare the capacitor voltage signal to a capacitor low voltage to produce the capacitor low signal.

Various embodiments are described, including a current sensing circuit configured to receive the capacitor voltage signal and to produce a capacitor mode regulate signal and an over current protection signal that are input into the control logic.

Various embodiments are described, wherein the current sensing circuit includes a first comparator configured to produce the capacitor mode regulation signal and a second comparator configured to produce the over current protection signal.

Various embodiments are described, including an adder configured to add the symmetry correction signal to the current measurement signal, wherein an output of the adder is connected to the integrator.

Various embodiments are described, further including a differential amplifier with differential inputs connected to the current measurement circuit of the resonant converter, wherein the differential amplifier is configured to produce the current measurement signal.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "in the alternative"). Also, the various embodiments described herein are not necessarily mutually exclusive, as some embodiments can be combined with one or more other embodiments to form new embodiments.

A converter controller integrated circuit (IC) may be used to control a resonant power converter. The converter controller may receive a voltage and current measurement from the resonant converter in order to control the resonant converter. Because the number of pins of the resonant controller IC should always be minimized and new controllers have a lot of programmability inside, an embodiment of a converter controller will be described that combines both functions at one pin without changing the control method. For high power and high frequency applications, it is also difficult to measure both signals in a clean way. So by combining the functions at one pin, the newly available unused pin may now be used for getting clean signals. With this method only one floating measurement needs to be done in a full bridge converter instead of two. This makes the method also very beneficial.

In existing converter controllers, the control is done via Vcap control using the voltage of the resonant capacitor, and the voltage at the resonant capacitor has to be measured. The primary current of the resonant converter is also measured to implement some features which are described below. In embodiments of a converter controller described herein, the final goal is to combine the two measurements.

Figure 1:
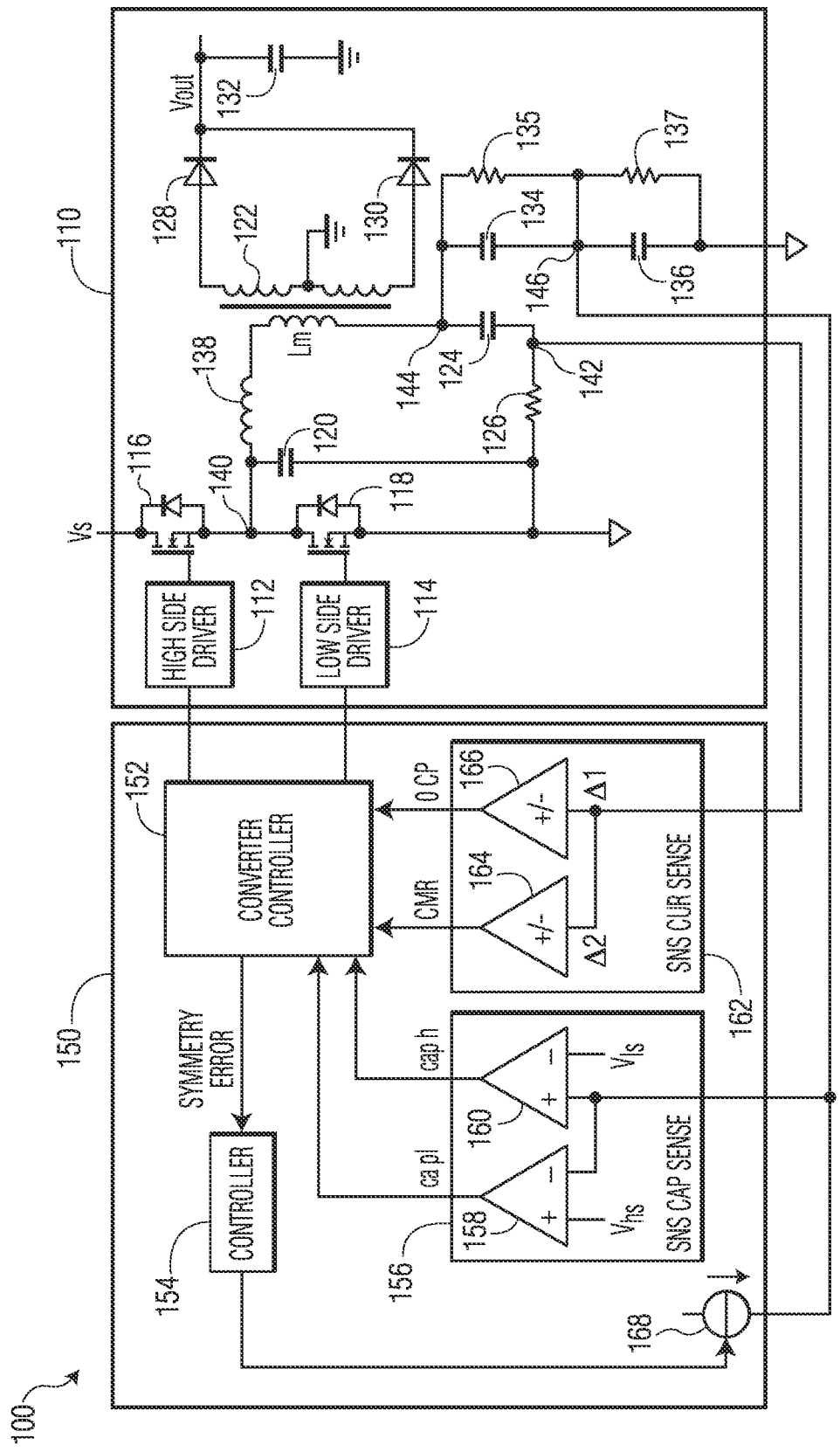
FIG. 1 illustrates a power converter.

FIG. 1 illustrates a power converter. The power converter 100 includes a resonant converter 110. The resonant converter includes a high side driver 112 and transistor 116 and a low side driver 114 and transistor 116. Based upon the control signals received by the high side driver 112 and the low side driver 114, a square wave of a desired frequency may be generated. The resonant converter 110 then has a passive circuit that converts the square wave into a sinusoid wave. The passive circuit includes a transformer 122. The transformer 122 has one input connected to an inductor 138 which is then connected to a node 140 between the high side transistor 116 and the low side transistor 118. Further a capacitor 120 is connected between the node 140 and ground. A resonant capacitor 124 and sense resistor 126 are connected in series between the second input of the transformer 122 and ground. A capacitive voltage divider including capacitors 134, 136 is connected between a node 144 (situated between the transformer 122 and resonant capacitor 124) and ground. The DC voltage of capacitor 124 is equal to the DC voltage at node 140. The on time of transistors 116 and 118 determine the DC level of node 140. The DC level should be around half of the input voltage Vs. In general the voltage across the capacitor 124 is too high to connect directly to an IC. So the voltage divider as described above has to be added. Because power consumption is very important in these applications, a resistive divider is not an option, but a capacitor divider is used (with an optional with high ohmic parallel resistors 135, 137).

Node 144 is connected to the second input of the transformer. Each of the outputs of the transformer 122 are connected to diodes 128, 130. The output of the diodes are combined to produce the output voltage Vout. A capacitor 132 is also connected between the output of the diodes 128, 130 and ground.

Figure 2:
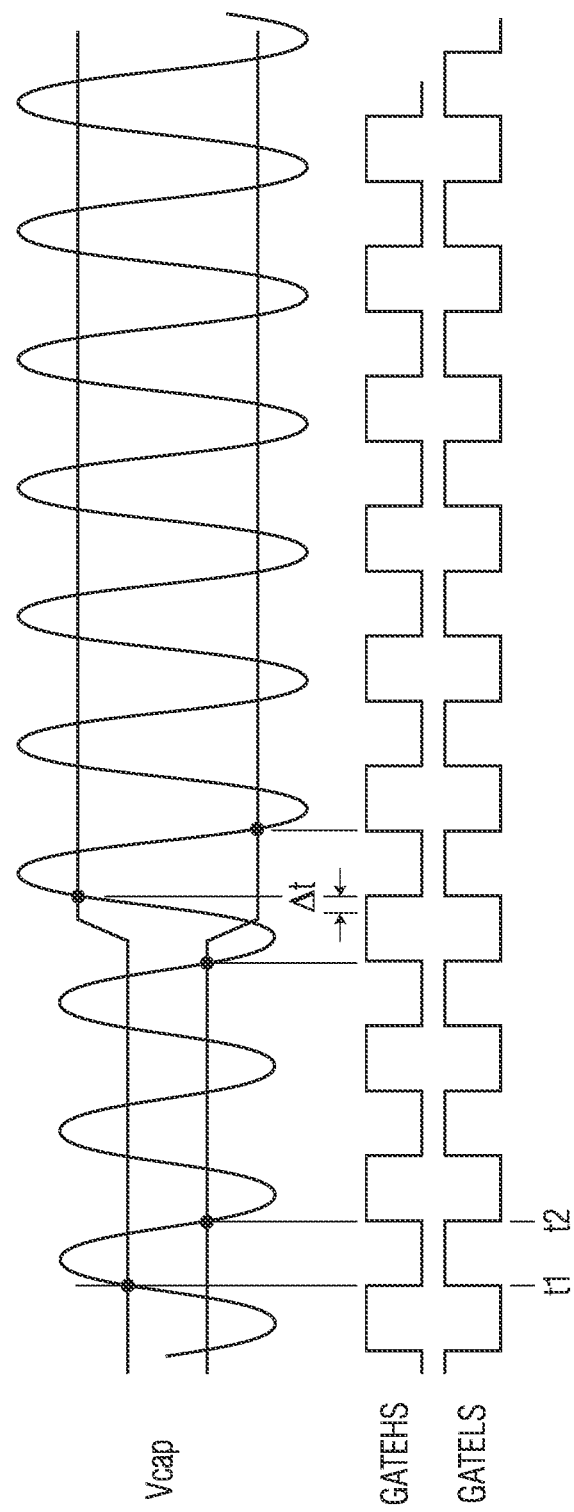
FIG. 2 illustrates plots of Vcap and the high side control signal GATEHS and the low side control signal GATELS.

The power converter 100 also includes a converter controller 150. This converter controller 150 receives a measure of the current and voltage at the resonant capacitor 124, which is then used to control the resonant converter 110. A voltage sensing circuit 156 receives a voltage signal Vcap from a node 146 of the capacitive voltage divider. The node 146 is between capacitors 134, 136. The capacitive voltage divider reduces the voltage measured at the resonant capacitor 124. The voltage sensing circuit 156 includes two comparators 158, 160. The comparator 158 compares the received voltage to a high side voltage level Vhs to produce a capl signal that is used by a converter controller 152 to produce a high side gate drive signal. The comparator 160 compares the received volage to a low side voltage level Vls to produce a caph signal this is used by the converter controller 152 to produce a low side gate drive signal. FIG. 2 illustrates plots of Vcap, the high side control signal GATEHS, and the low side control signal GATELS.

The converter controller 150 also includes a current sensing circuit 162 that receives a voltage Vcur measured at the sense resistor 126. This voltage is indicative of the current following through the sense resistor 126 as well as the resonant capacitor 124 as well inductor 138. The current sensing circuit 162 also includes comparators 164, 166 that receive Vcur and reference levels. The OCP signal becomes high when the Vcur is larger than a specified voltage, such as for example, 1.5V or smaller than −1.5V. The CMR signal becomes high when the Vcur voltage is lower than a specified voltage, such as for example 100 mV or larger than −100 mV. How the near capacitive mode works shall not be explained further, because it is not important for embodiments describe herein (only that current information is needed). The CMR signal is a capacitive mode regulation signal that is used to control the operation of the resonant converter 110 so that it operates near a capacitive mode. The OCP signal is an over current protection signal used to detect over current situations. Further, at start-up, when the system slowly increases the difference between the Vhs level and the Vls level, the IC monitors continuously the primary current. When this current exceeds a predefined level, the increase of the difference of the Vcap level is on hold until the current drops below the predefined level.

The converter controller 152 receives the capl, caph, CMR, and OCP signals and uses them to generate the high side drive signal GATEHS and low side drive signal GATELS used to control the high side transistor 116 and the low side transistor 118. This is done using known control methods.

When a capacitor divider is used the DC information of capacitor 124 is lost. Therefore, a symmetry loop may be used to regulate the DC voltage to an internally defined value at the voltage sensing pin by injecting current in the pin, such that the symmetry error becomes zero. The symmetry error can be the difference between the on-time of the high side switch minus the on-time of low side switch or a duty cycle ratio based on the measured of both on-times where the duty cycle is compared with a defined setpoint, e.g., 50%. The symmetry controller 154 may be a P, PI or PID controller. The symmetry controller controls a current source 168 that produces a current applied to the Vcap signal to create a control loop that keeps the resonant converter at a desired duty cycle.

It is common for the IC implementing the power converter 100 to control both power factor correction (PFC) and the LLC. The problem is that when two converters are controlled, which are not running at the same frequency, that disturbance is a large problem. Because the number of pins to may need to be limited (i.e., because a higher number of pin packages are more expensive and very big), a controller IC may only have one ground pin. In the PFC the disturbance issue is solved by using a control method, which is insensitive to disturbance: e.g., average mode control. For a LLC resonant converter it is still desired to use Vcap control, because of its advantages of control, but it is sensitive to noise. Also the CMR, OCP, zero current detection, and Ipeak control during start up are sensitive to noise. In present designs it is desired to use higher switching frequencies of the LLC, which means that filtering has to be less, to reduce the delays. As a result, the noise problem becomes even greater.

The embodiments of a power converter described herein do not use a capacitor voltage sensing pin and the measured voltage is generated internally from the sensed current signal. This results in one spare pin which may be used to measure a current differential and/or as a sense ground to solve the disturbance issue.

The features of the embodiments of the power converted described herein include: removing the measurement of the voltage across the resonant capacitor of the resonant converter; generating the capacitor voltage signal internally based on the primary current signal; when the primary current signal is clean, the generated capacitor voltage signal is also clean (because of integration); using the released pin to perform an improved (disturbance free) measurement of the primary current; reducing the number of pins and/or number of components by generating the voltage across the capacitor internally; and when the voltage of the resonant capacitor is generated internally, the same control and features as currently implemented may be used as if the voltage of the resonant capacitor is directly measured.

Figure 3:
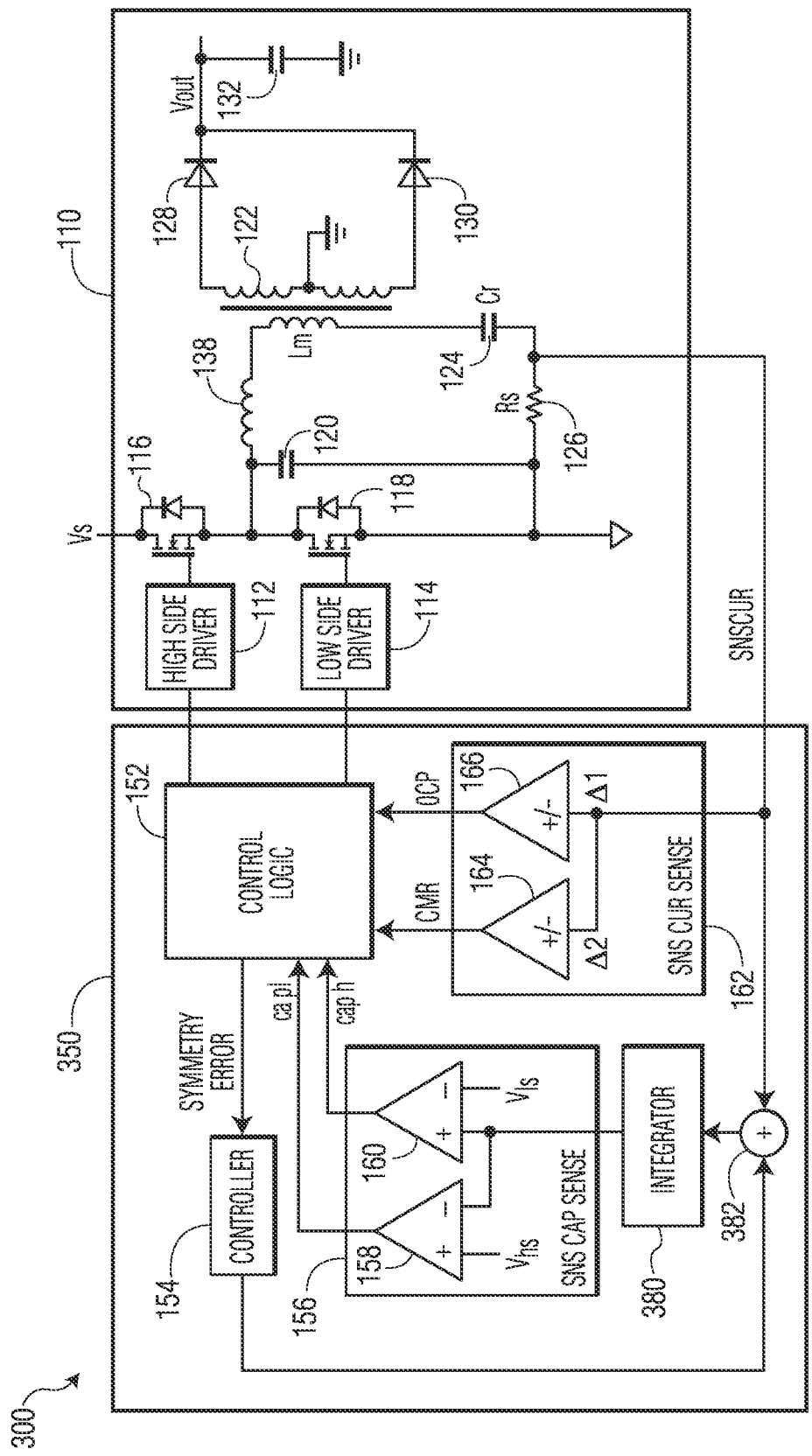
FIG. 3 illustrates an embodiment of a power converter that internally generates Vcap.

FIG. 3 illustrates an embodiment of a power converter that internally generates Vcap. The power converter 300 includes most of the elements of the power converter 100 of FIG. 1. The power converter 300 uses the same control methodology as the power converter 100, except for how the capacitor voltage Vcap is determined. Hence, the description of elements in FIG. 3 with the same number as those in FIG. 1 are the same and not repeated here. As before, the current through the resonant capacitor 124 is measured by measuring the voltage at the sense resistor 126. The sense resistor 126 acts as a current measuring circuit. As before, the current sensing circuit 162 receives the voltage Vcur. This voltage Vcur is also input into an integrator 380 that generates a measured voltage corresponding to the voltage Vcap at the resonant capacitor 124. This generated Vcap is input into the voltage sensing circuit 156 which then operates as described above. In addition, as the DC level is unknown as above, the controller 154 now produces a symmetry control signal that is added to Vcur using adder 382. This symmetry control signal is adjusted by the symmetry controller 154 in order to achieve the desired duty cycle (e.g., 50%).

Figure 4:
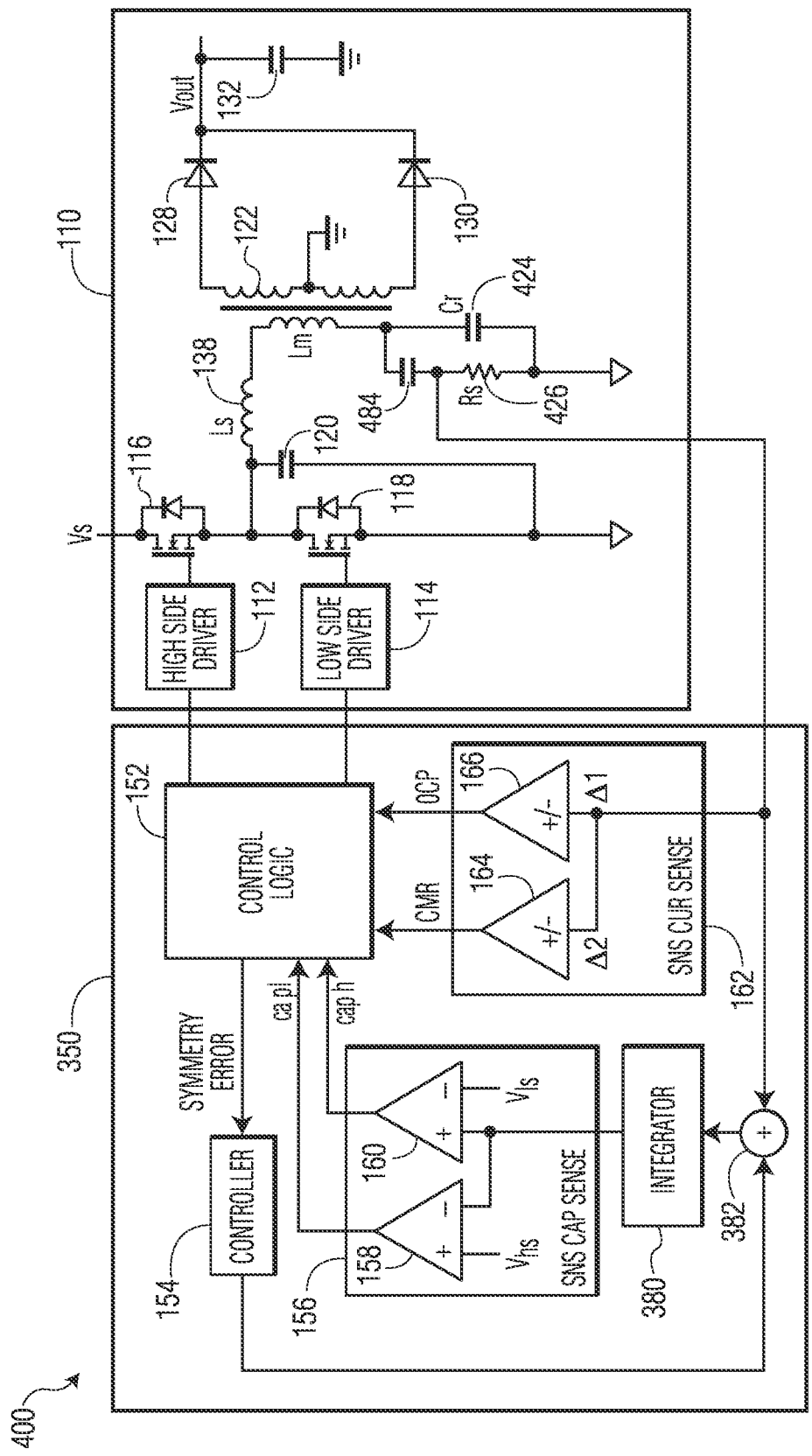
FIG. 4 illustrates another embodiment of a power converter that internally generates Vcap.

FIG. 4 illustrates another embodiment of a power converter that internally generates Vcap. The power converter of FIG. 4 only differs from the power converter 300 in FIG. 3 in that the current measuring circuit includes additional components that are used to measure the voltage at the sense resistor 426. Specifically, a capacitor 484 and the sense resistor 426 are connected in parallel with the resonant capacitor 424. The voltage Vcur is measured at a node between the capacitor 484 and the sense resistor 426. This embodiment moves the sense resistor 426 out of the power path to reduce power consumption.

In yet another embodiment, the current through the resonant capacitor 424 may be measured using current sense circuit including a transformer. This approach will remove the sense resistor from power path and added to the output of the transformer, and because the sense resistor is now not in the power path, this will reduce power consumption.

Figure 5:
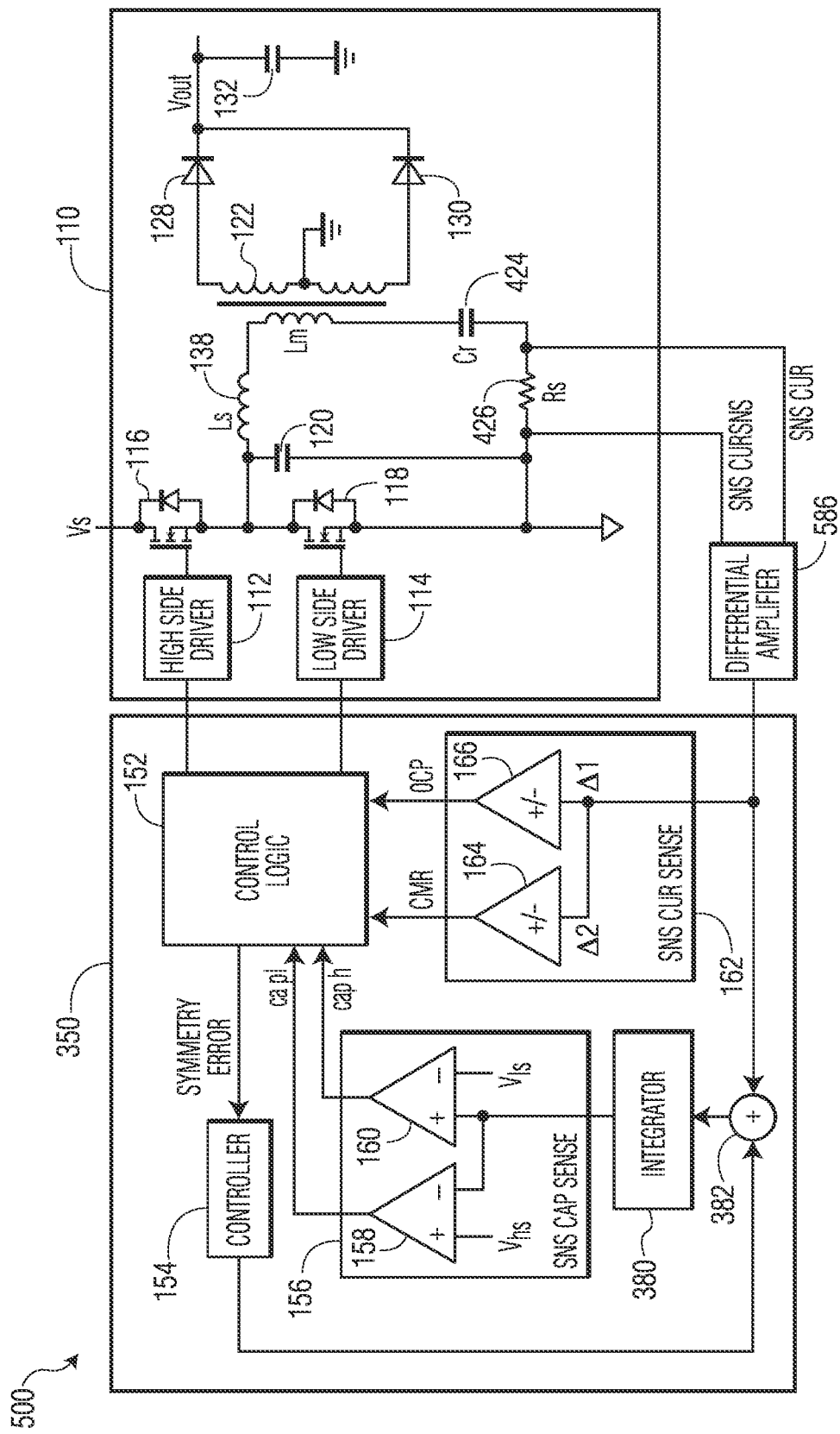
FIGS. 5 and 6 illustrate additional embodiments of power converters that internally generate Vcap using a differential amplifier.

The power converters 300, 400 of FIGS. 3 and 4 use one pin less than the prior-art approaches, but the main reason to carry out this change is to reduce disturbance sensitivity of the application. As stated above, the continuous signals of the power converter are needed to control the resonant converter. This is noise sensitive especially in high power applications and high frequency applications. Because one pin is removed, it is possible to improve the disturbance sensitivity with an additional ground pin. Even with this extra ground, disturbance may still be picked up in the application by PCB loops. Differential sensing may be used to reduce the disturbance. In addition, the sense wires and/or resistors in the application should be placed close to one another on the PCB layout. In FIG. 5, the proposal of differential sense is given with the sense resistor in the power path (same number of pins needed as in the prior art).

Figure 6:
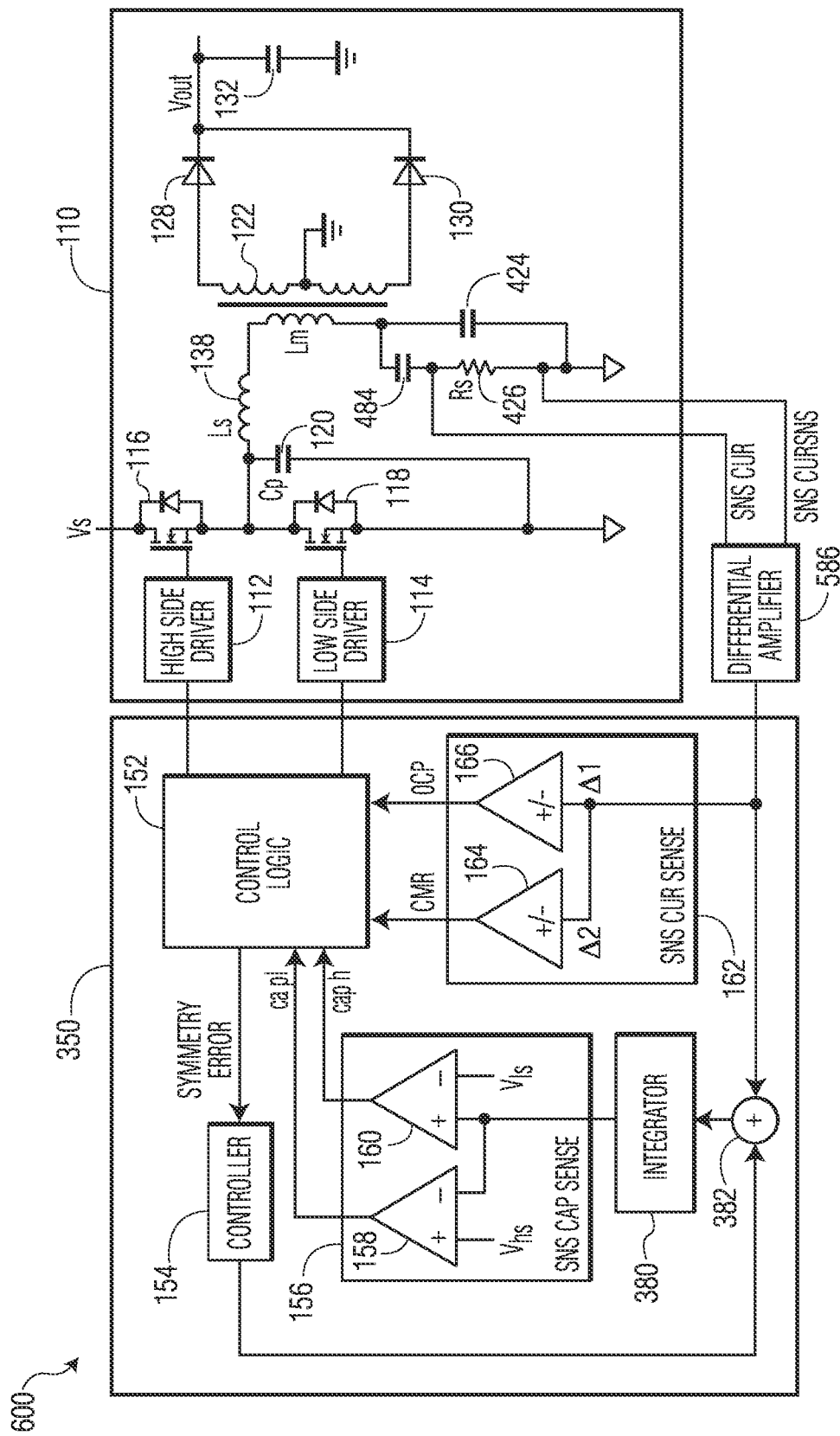
Figure 8:
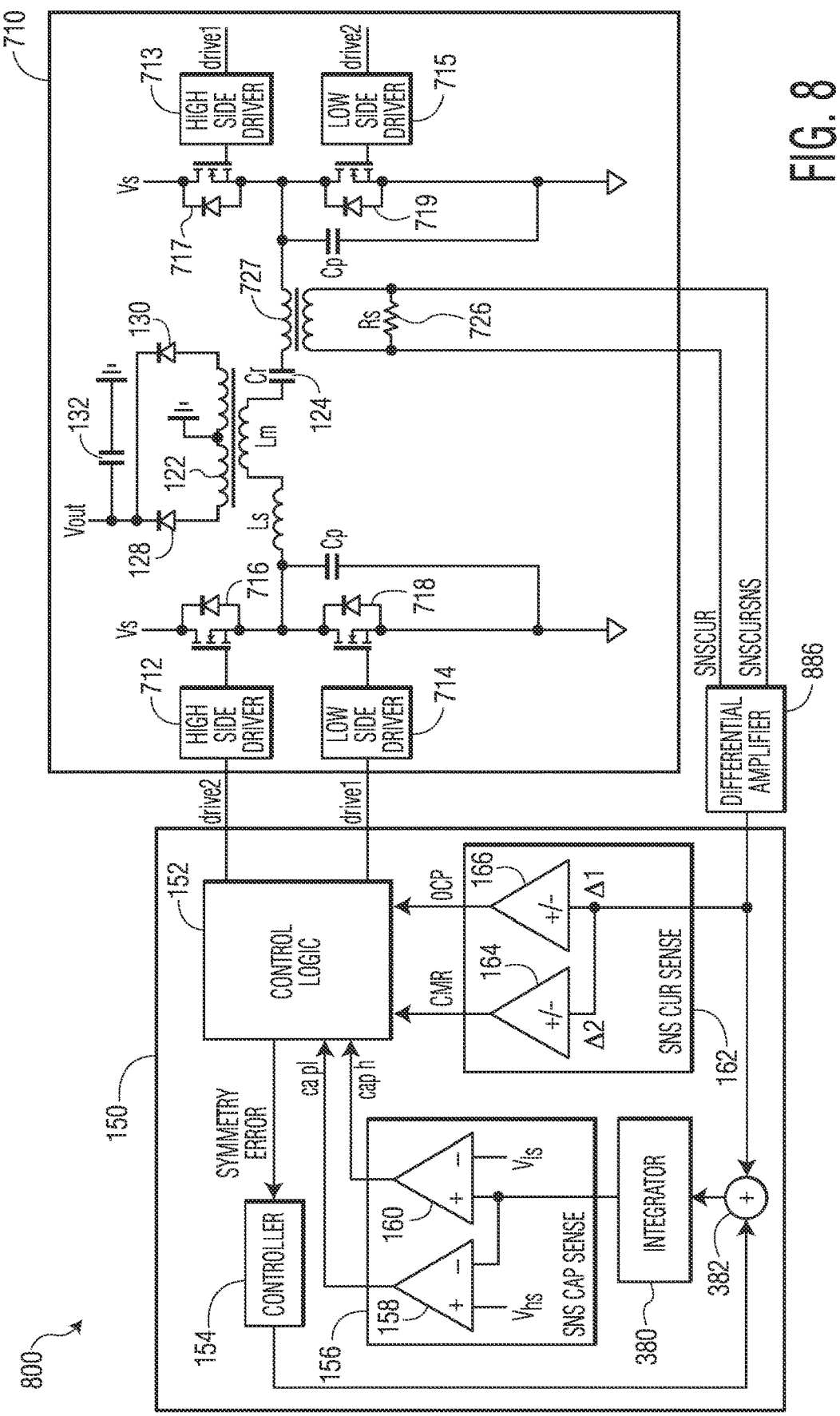
FIG. 8 illustrates a second embodiment of a full bridge power converter.

FIGS. 5 and 6 illustrate additional embodiments of power converters that internally generate Vcap using a differential amplifier It is noted that the differential amplifier can be in an integrated circuit implementing the power controller, and further that the differential amplifier may be part of the converter controller block 350, 150 in FIGS. 5, 6, and 8. The power converters 500, 600 of FIGS. 5 and 6 are identical to the power converters 300, 400 respectively, except for the addition of a differential amplifier 586. The differential amplifier 586 is connected across the sense resistor 124, 424 to differentially measure the voltage across the sense resistor. The differential amplifier 586 converts the differential voltage to a single ended voltage. At the output of the differential amplifier 586 the current information is available and after integration the Vcap information is also available. The use of a differential measurement helps to reduce the effect of the disturbances described above.

Also, as described above a current sense transformer may also be used in the current sense circuit to sense the current using differential sensing.

As described above Vcap control may be used to implement a high power mode, low power mode, and a burst mode. Because these control modes provide the needed performance, the control mechanism of the embodiments described above use Vcap control. As a result, the Vcap signals are generated internally in the IC from the measured current. So in all the embodiments described above, the system behaves functionally the same as in the prior art to provide all of the benefits of Vcap control.

Figure 7:
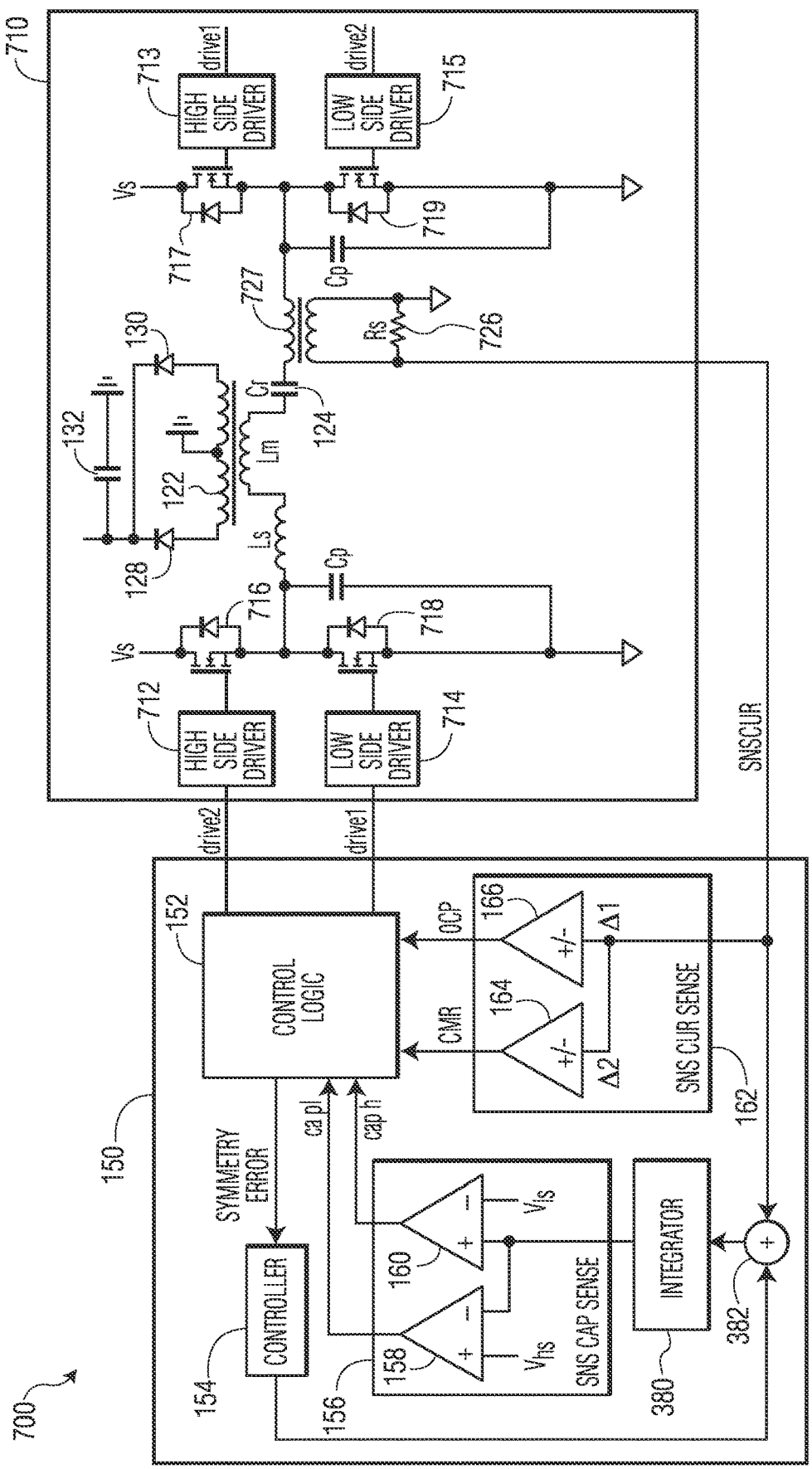
FIG. 7 illustrates a first full bridge resonant converter embodiment.

The use of a current transformer described above also allows for the use of the embodiments of converter controllers described above in combination with full bridge resonant converters. As for a full bridge resonant converter, the resonant tank current cannot be sensed based on a ground related sensing such as indicated in FIGS. 5 and 6, a current transformer could be used to sense the primary current also in the full bridge while voltages switch between ground and Vs. FIG. 7 illustrates a first full bridge resonant converter embodiment of this sort. The power converter 700 uses the same converter control 150 as described above adapted for full bridge converter control. The resonant converter 710 includes a full bridge resonant converter which adds additional high side driver 713, low side driver 715, and transistors 717 and 719. The current transformer 727 along with sense resistor 726 provides a measurement of the current through the resonant capacitor 124. FIG. 8 illustrates a second embodiment of a full bridge power converter. The power converter 800 is the same as the power converter 700 of FIG. 7, except that it takes a differential measurement of the current through the current transformer 727 and the sense resistor 726 which is input into the differential amplifier 886. The differential amplifier 886 then outputs a signal indicative of the current through the resonant capacitor 124. Using current inputs with virtual ground inputs allows the current transformer to have no voltage across its terminals, and therefore it does not build up magnetizing current that could otherwise disturb the sensed current signal by an undesired magnetizing current component in the current sense transformer.

The power converter embodiments described herein may be used in applications where resonant converter are used. Such applications of resonant converters applications may include adapters, televisions, gaming systems, lighting, automotive applications, battery chargers, etc.

The power converter embodiments described herein help to reduce the effects of perturbations in the control of the resonant converter. This may be accomplished by internally generating the measured Vcap voltage and using the pin saved to be an extra ground. Also differential measurement of the voltage may be used reduce the effects of the perturbations. Another advantage of removing the Vcap pin is that fewer external components are needed in the application.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A power converter, comprising:
a resonant converter including:
a resonant capacitor; and
a current measurement circuit configured to measure current in the resonant capacitor;
a converter controller configured to control the resonant converter including:
an integrator configured to receive a current measurement signal from the current measurement circuit and to produce a capacitor voltage signal indicative of the voltage at the resonant capacitor;
a control logic configured to produce a high side driver signal, a low side driver signal, a symmetry error signal based upon the capacitor voltage signal and the current measurement signal; and
a symmetry controller configured to produce a symmetry correction signal based upon the symmetry error signal, wherein the symmetry error signal is input into the integrator to control the duty cycle of the high side driver signal and the low side driver signal, wherein the high side driver signal and the low side driver signal control the operation of the resonant converter.

2. The power converter of claim 1, wherein the current measurement circuit includes a sense resistor in series with the resonant capacitor.

3. The power converter of claim 2, further comprising a differential amplifier with differential inputs connected across the sense resistor configured to produce the current measurement signal.

4. The power converter of claim 1, wherein the current measurement circuit includes a sense resistor in series with the resonant capacitor and a filter capacitor in parallel with the sense resistor.

5. The power converter of claim 1, wherein the current measurement circuit includes a current sense transformer.

6. The power converter of claim 5, further comprising a differential amplifier with differential inputs connected across the current sense transformer configured to produce the current measurement signal.

7. The power converter of claim 1, wherein the current measurement circuit includes a sense resistor in series with a sense capacitor, wherein series sense resistor and sense capacitor are connected in parallel with the resonant capacitor.

8. The power converter of claim 7, further comprising a differential amplifier with differential inputs connected across the sense resistor configured to produce the current measurement signal.

9. The power converter of claim 1, wherein the converter controller includes a voltage sensing circuit configured to receive the capacitor voltage signal and to produce a capacitor high signal and a capacitor low signal that are input into the control logic.

10. The power converter of claim 9, wherein the voltage sensing circuit includes a first comparator configured to compare the capacitor voltage signal to a capacitor high voltage to produce the capacitor high signal and a second comparator configured to compare the capacitor voltage signal to a capacitor low voltage to produce the capacitor low signal.

11. The power converter of claim 1, wherein the converter controller includes a current sensing circuit configured to receive the capacitor voltage signal and to produce a capacitor mode regulate signal and an over current protection signal that are input into the control logic.

12. The power converter of claim 11, wherein the current sensing circuit includes a first comparator configured to produce the capacitor mode regulation signal and a second comparator configured to produce the over current protection signal.

13. The power converter of claim 1, wherein the converter controller includes an adder configured to add the symmetry correction signal to the current measurement signal, wherein an output of the adder is connected to the integrator.

14. The power converter of claim 1, further comprising a differential amplifier with differential inputs connected to the current measurement circuit, wherein the differential amplifier is configured to produce the current measurement signal.

15. A converter controller configured to control a resonant converter, comprising:
an integrator configured to receive a current measurement signal from a current measurement circuit in the resonant converter and to produce a capacitor voltage signal indicative of the voltage at the resonant capacitor;
a control logic configured to produce a high side driver signal, a low side driver signal, a symmetry error signal based upon the capacitor voltage signal and the current measurement signal; and
a symmetry controller configured to produce a symmetry correction signal based upon the symmetry error signal, wherein the symmetry error signal is input into the integrator to control the duty cycle of the high side driver signal and the low side driver signal,
wherein the high side driver signal and the low side driver signal control the operation of the resonant converter.

16. The converter controller of claim 15 including, a voltage sensing circuit configured to receive the capacitor voltage signal and to produce a capacitor high signal and a capacitor low signal that are input into the control logic.

17. The converter controller of claim 16, wherein the voltage sensing circuit includes a first comparator configured to compare the capacitor voltage signal to a capacitor high voltage to produce the capacitor high signal and a second comparator configured to compare the capacitor voltage signal to a capacitor low voltage to produce the capacitor low signal.

18. The converter controller of claim 15, including a current sensing circuit configured to receive the capacitor voltage signal and to produce a capacitor mode regulate signal and an over current protection signal that are input into the control logic.

19. The converter controller of claim 18, wherein the current sensing circuit includes a first comparator configured to produce the capacitor mode regulation signal and a second comparator configured to produce the over current protection signal.

20. The converter controller of claim 15, including an adder configured to add the symmetry correction signal to the current measurement signal, wherein an output of the adder is connected to the integrator.

21. The converter controller of claim 15, further comprising a differential amplifier with differential inputs connected to the current measurement circuit of the resonant converter, wherein the differential amplifier is configured to produce the current measurement signal.

* * * * *